(12) United States Patent
Zhang (10) Patent No.: US 8,663,392 B2
(45) Date of Patent: Mar. 4, 2014

(54) METHOD AND APPARATUS FOR LIGNOCELLULOSE PRETREATMENT USING A SUPER-CELLULOSE-SOLVENT AND HIGHLY VOLATILE SOLVENTS

(75) Inventor: Y. H. Percival Zhang, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 78 days.

(21) Appl. No.: 12/404,466

(22) Filed: Mar. 16, 2009

(65) Prior Publication Data

US 2009/0229599 A1    Sep. 17, 2009

Related U.S. Application Data

(60) Provisional application No. 61/036,813, filed on Mar. 14, 2008.

(51) Int. Cl.
*C13K 1/02*    (2006.01)
*C13B 20/00*   (2011.01)
*C08B 30/00*   (2006.01)

(52) U.S. Cl.
USPC ............... 127/1; 127/37; 127/9; 127/34

(58) Field of Classification Search
None
See application file for complete search history.

(56) References Cited

U.S. PATENT DOCUMENTS

| | | | |
|---|---|---|---|
| 2,106,797 A | 2/1938 | Henry | |
| 3,402,997 A | 9/1968 | Mustian, Jr. | |
| 4,058,411 A | 11/1977 | Bellamy et al. | |
| 4,174,976 A | 11/1979 | Bose et al. | |
| 4,265,675 A | 5/1981 | Tsao et al. | |
| 4,281,063 A * | 7/1981 | Tsao et al. | ............ 435/99 |
| 4,677,198 A | 6/1987 | Linnett et al. | |
| 5,628,941 A | 5/1997 | Kalt et al. | |
| 6,228,177 B1 | 5/2001 | Torget | |
| 6,258,175 B1 | 7/2001 | Lightner | |

(Continued)

FOREIGN PATENT DOCUMENTS

| | | |
|---|---|---|
| CN | 1588085 A | 3/2005 |
| EP | 0147634 B2 | 6/1996 |

(Continued)

OTHER PUBLICATIONS

Boerstoel, H. Liquid Crystalline Solutione of Cellulose in Phosphoric Acid, Mar. 2001, Polymer 42, pp. 7371-7379.*

(Continued)

*Primary Examiner* — Milton I Cano
*Assistant Examiner* — Sarah A Slifka
(74) *Attorney, Agent, or Firm* — New River Valley IP Law, PC; Michele L. Mayberry (57) ABSTRACT

Embodiments of the present invention overcome the well-known recalcitrance of lignocellulosic biomass in an economically viable manner. A process and a system are provided for the efficient fractionation of lignocellulosic biomass into cellulose, hemicellulose, and lignin. The cellulose and hemicellulose thus obtained are highly amorphous and can be readily converted into highly concentrated mixtures of five and six carbon sugars using known methods. Typical yields of sugars exceed 100 grams of sugars per liter of sugar solution. Other products, such as alcohols, can easily be prepared according to methods of the invention. The modest process conditions and low solvent/solid ratios of some embodiments of the invention require relatively low capital and processing costs.

17 Claims, 6 Drawing Sheets

(56) References Cited

U.S. PATENT DOCUMENTS

| | | | |
|---|---|---|---|
| 7,932,065 | B2 | 4/2011 | Medoff |
| 2008/0295981 | A1 | 12/2008 | Shin et al. |
| 2010/0170504 | A1 | 7/2010 | Zhang |

FOREIGN PATENT DOCUMENTS

| | | | | |
|---|---|---|---|---|
| FR | | 2264489 | A1 * | 10/1975 |
| GB | | 2017707 | A | 10/1979 |
| JP | | 57022695 | A | 2/1982 |
| JP | | 2006149343 | | 6/2006 |
| JP | | 2006149343 | A | 6/2006 |
| JP | | 5209597 | B2 | 6/2013 |
| RU | | 2189996 | C2 | 9/2002 |
| RU | | 2463402 | C2 | 10/2012 |
| WO | | 9523827 | A | 9/1995 |
| WO | | 2007019505 | A | 2/2007 |
| WO | | 2007095787 | A | 8/2007 |
| WO | WO 2007/111605 | | A1 | 10/2007 |
| WO | | 2009114843 | A1 | 9/2009 |

OTHER PUBLICATIONS

International Search Reports and Written Opinions from PCT/US2009/037234.
Co-Pending application CN200680054729.0, office action 3 and translation.
Co-Pending application CN200680054729.0, response to office action 3 and claims translation.
Co-pending Application JP 2009-502734, Office Action and Translation dated Aug. 23, 2011.
Co-pending Application JP 2009-502734, Response to Aug. 23, 2011Office Action, with Claims Translation.
Co-pending application CN200680054729.0, office action 1 and translation, dated Oct. 9, 2010.
Co-Pending application CN200680054729.0, office action 2 and translation, dated Apr. 11, 2011.
Co-Pending application CN200680054729.0, response to office action 1 and claims translation, dated Feb. 23, 2011.
Co-Pending application CN200680054729.0, response to office action 2 with declaration and claims translation, dated Jun. 24, 2011.
Co-pending Application JP 2009-502734, Dec. 6, 2011 Office Action and Translation.
Australian Examination Report dated Dec. 9, 2010 from co-pending Australian Application No. 06748858.5.
Co-Pending application CN200680054729.0, office action 1 and translation.
Co-Pending application CN200680054729.0, office action 2 and translation.
Co-Pending application CN200680054729.0, response to office action 1 and claims translation.
Co-Pending application CN200680054729.0, response to office action 2 and claims translation and declaration translation.
Co-pending U.S. Appl. No. 12/294,923.
Co-pending application, PCT/US09/37234 (published as WO2009/114843).
Co-pending EU application 06748858, issued as EP2007945, file history.
European Examination Report dated Feb. 10, 2010 for co-pending European Application No. 06748858.5.
International Preliminary Report on Patentability from PCT/US2009/037234, 5pgs.
International Preliminary Report on Patentability from WO2007/111605.
International Search Reports and Written Opinions from PCT/US2009/037234, 16 pgs.
International Written Opinion from WO2007/111605.
Co-Pending application CN200680054729.0, office action 4 translation, dated Jun. 29, 2012.
Co-Pending application CN200680054729.0, office action 4, dated Jun. 29, 2012.
Co-Pending application CN200680054729.0, response to office action 1 (translation) dated Feb. 23, 2011.
Co-Pending application CN200680054729.0, response to office action 2 (translation) dated Jun. 24, 2011.
Co-Pending application CN200680054729.0, response to office action 3 (translation), dated Sep. 13, 2011.
Co-Pending application CN200680054729.0, response to office action 4 (and translation), dated Sep. 14, 2012.
Co-Pending application CN200980117175.8, Notification to Make Divisional, dated Apr. 16, 2012, with translation, 3pgs.
Co-Pending application India 2274/MUMNP/2008, First Examination Report, dated Feb. 22, 2012, 3 pgs.
Co-Pending application India 2274/MUMNP/2008, Response to First Examination Report, dated Aug. 21, 2012.
Co-Pending application JP 2009-502734, response to office action 1 (translation), dated Nov. 17, 2011.
Co-Pending application JP 2009-502734, response to office action 2 (translation) dated Jun. 4, 2012.
Co-Pending Application, AU006340913, Australian Examination Report dated Jul. 4, 2012.
Co-Pending Application, AU006340913, Response to Office Action 2, dated Sep. 6, 2012.
Co-Pending Application, AU006340913, Response to Office Action, Jun. 27, 2012.
Co-Pending application CN200980117175.8, office action 1 translation, dated Sep. 4, 2012.
Co-Pending application CN200980117175.8, office action 1, dated Sep. 4, 2012.
Co-Pending application CN200980117175.8, Response to Notification for Divisional dated Jul. 9, 2012 (no translation available).
Co-Pending application CN200980117175.8, Response to office action 1, claims, and translation, dated Jan. 21, 2013.
Co-Pending application India 2274/MUMNP/2008, Second Response to First Examination Report, dated Feb. 22, 2013.
Co-pending Application JP 2009-502734, Decision of Grant (Translation), Jan. 22, 2013.
Co-pending Application JP 2009-502734, Decision of Grant, Jan. 15, 2013.
Co-pending Application JP 2009-502734, Response to Office Action 2 in Japanese, with Claims Translation dated Jun. 4, 2012.
Co-Pending Application, AU006340913, Australian Official Notice of Acceptance dated Sep. 7, 2012.
Co-Pending Application, AU2009223302, Australian Examination Report dated Dec. 13, 2012.
Co-Pending Application, CA 2,647,516, Examiner's Report dated Dec. 6, 2012.
Co-Pending application CN200980117175.8, office action 2 translation, dated Feb. 21, 2013.
Co-Pending application CN200980117175.8, office action 2, dated Feb. 21, 2013.
Isogai and Atalla, "Dissolution of cellulose in aqueous NaOH solutions", Cellulose 5, 309-319, 1998.
John E. Hanby, Jr., Doctor's Dissertation, "The Bond Structure in the Alkaline-Ferric-Tartrate System", The Institute of Paper Chemistry, Appleton, Wisconsin, 1968.
Laslo Zechmeister, Dissertation, "Zur Kenntnis der Cellulose und des Lignins", ETH Zürich, Switzerland, 1913.
Laslo Zechmeister, Dissertation, "Zur Kenntnis der Cellulose und des Lignins", ETH Zürich, Switzerland, 1913. (Translation).
Sarah Köhler, Dissertation, "Ionische Flüssigkeiten als neue Reaktionsmedien für die Veretherung von Cellulose", Friedrich-Schiller-Universität Jena, 2010.
Sarah Köhler, Dissertation, "Ionische Flüssigkeiten als neue Reaktionsmedien für die Veretherung von Cellulose", Friedrich-Schiller-Universität Jena, 2010. (Translation).
Co-Pending Application No. RU2010141585, English Translation of Office Action of Feb. 1, 2013.
Co-Pending Application No. RU2010141585, Office Action of Feb. 1, 2013.
N.S. Zefirov, Himicheskaja Encyklopedija [Chemical Encyclopaedia] , vol. 5, Gol'shaja Sovetskaja Encyklopedija, Moscow, 1998.

(56) References Cited

OTHER PUBLICATIONS

Co-Pending Application, U.S. Appl. No. 13/867,573, filed Apr. 22, 2013.
Co-Pending Application CA 2,647,516, Response to Examiner's Report, dated Jun. 6, 2013.
Co-Pending application CN200980117175.8, (translation) response to office action 2, dated Jul. 8, 2013.
Co-Pending application CN200980117175.8, office action 3 translation, dated Jul. 19, 2013.
Co-Pending application CN200980117175.8, office action 3, dated Jul. 19, 2013.
Co-Pending application CN200980117175.8, response to office action 2, dated Jul. 8, 2013.
Co-Pending Application EU 09720599.1, Extended European Search Report, dated Aug. 29, 2013.
Co-Pending application India 2274/MUMNP/2008, Hearing Notice, dated Aug. 7, 2013.
Co-Pending Application No. RU2010141585, Response to Office Action Translation, dated Aug. 1, 2013.
Co-Pending Application No. RU2010141585, Response to Office Action, dated Aug. 1, 2013.
Co-Pending Application CA 2,647,516, Notice of Allowance, dated Oct. 21, 2013.
Co-Pending application CN200980117175.8, Response to office action 3, dated Sep. 29, 2013.
Co-Pending application CN200980117175.8, Translation of Response to office action 3, dated Sep. 29, 2013.
Co-Pending application India 2274/MUMNP/2008, Response to Hearing Notice, dated Oct. 11, 2013, 17 pages.
Co-pending Application JP 2010-550913, First Office Action dated Oct. 28, 2013.
Co-pending Application JP 2010-550913, Translation of First Office Action dated Oct. 28, 2013.
Co-Pending Application No. RU2010141585, Decision to Grant dated Aug. 22, 2013 and Translation, 13 pages.
Co-Pending Application, AU2009223302, Notice of Acceptance dated Nov. 21, 2013.
Co-Pending Application, AU2009223302, Response to Australian Examination Report dated Nov. 15, 2013, 19 pages.

* cited by examiner

METHOD AND APPARATUS FOR LIGNOCELLULOSE PRETREATMENT USING A SUPER-CELLULOSE-SOLVENT AND HIGHLY VOLATILE SOLVENTS

CROSS-REFERENCE TO RELATED APPLICATIONS

This application relies on and claims the benefit of the filing date of U.S. provisional patent application No. 61/036,813, filed 14 Mar. 2008, the entire disclosure of which is hereby incorporated herein by reference.

BACKGROUND OF THE INVENTION

1. Field of the Invention

The present invention relates to the field of alternative energy sources and means for extracting energy from those sources. More particularly, the present invention relates to biological and biochemical degradation of plant material, including lignocellulose, for production of energy for use in human activities.

2. Description of Related Art

Production of biological-based products and bio-energy from renewable lignocellulose is of importance to sustainable development of human industrial society in the face of the depletion of natural resources, especially fossil fuels, and the resulting accumulation of atmospheric carbon dioxide ($CO_2$). Also, development of technologies for effectively converting agricultural and forestry residues to fermentable sugars offers outstanding potential to benefit the U.S. national interest. Furthermore, production of these second generation biofuels, such as cellulosic ethanol from renewable lignocellulosic biomass, as well as third generation biofuels, such as hydrogen and electricity, will lead the bioindustrial revolution necessary to the transition from a fossil fuel-based economy to a sustainable carbohydrate economy. Use of biofuels will offer several benefits, including reduced greenhouse gas emissions, decreased competition with tightening food supplies, enhanced rural economic development, and increased national energy security. However, key technological challenges in this area include finding new technologies for energy production and reducing the cost of technologies for converting biomass (primarily lignocellulose) into desired biobased industrial products and bioenergy.

Lignocellulosic biomass, such as agricultural and forestry residues, municipal and industrial solid wastes, and herbaceous and woody bioenergy plants, is a natural complex composite primarily consisting of three biopolymers: cellulose, hemicelluloses, and lignin. Lignocellulose typically contains cellulose (about 35-50 wt. %), hemicellulose (about 15-35%), and lignin (about 5-30%), depending on its origin. Natural cellulose molecules occur in elementary cellulose fibrils closely associated with other structural polysaccharides, such as hemicellulose, lignin, and pectin.

Efficient, cost-competitive production of fermentable sugars from recalcitrant biomass remains the largest obstacle to emerging cellulosic ethanol biorefineries. Biomass saccharification via biological conversion involves two key steps: lignocellulose pretreatment or fractionation followed by enzymatic cellulose (and perhaps hemicellulose) hydrolysis to produce fermentable sugars. The high processing costs of such a conversion process and the narrow margin between feedstock costs and sugar prices are the key obstacles for commercialization.

One of the most important technological challenges is to overcome the recalcitrance of natural lignocellulosic materials to allow for enzymatic hydrolysis to produce fermentable sugars. Lignocellulose pretreatment is perhaps the most costly step. Some estimates place the cost at about 40% of the total processing costs. In addition, the recalcitrance impacts the cost of most other operations involving lignocellulose decomposition, including the reduction in lignocellulose size prior to pretreatment. Pretreatment of lignocellulosic materials is thus strongly associated with downstream costs, including enzymatic hydrolysis rate, enzyme loading, mixing power consumption, product concentration, detoxification if inhibitors are generated, product purification, power generation, waste treatment demands, and other process variables.

The recalcitrance of cellulosic biomass to enzymes is believed to be attributed to 1) the complicated linkages among several main polysaccharides, including cellulose, hemicellulose, and lignin, which restrict hydrolysis actions of cellulases, hemicellulases, and laccases; and 2) the inherent properties of cellulosic material, which include low substrate accessibility for cellulases, a high degree of polymerization (DP), and poor solubility of cellulose fragments in water. Pretreatment of lignocellulosic materials has thus been recognized as an important step in improving overall yield of products from such materials.

All lignocellulose treatments can be divided into four main categories: 1) physical methods, including dry milling (chipping, ball milling, and comminuting), wet milling, irradiation, microwave, and swelling reagents (e.g., $ZnCl_2$); 2) chemical methods, including dilute acids (e.g., dilute $H_2SO_4$, $H_3PO_4$, HCl, acetic acid, formic acid/HCl), alkalis (e.g., NaOH, lime, ammonia, amine), organosolv, oxidizing agents (e.g., $O_3$, NO, $H_2O_2$, $NaClO_2$), cellulose solvents (e.g., cadoxen), DMAc/LiCl, and concentrated $H_2SO_4$; 3) physiochemical methods, including steam explosion with or without catalysts, $CO_2$ explosion, ammonia fiber explosion or expansion (AFEX), hot water with flow-through, supercritical fluid extractions (e.g., $CO_2$, $CO_2/H_2O$, $CO_2/SO_2$, $NH_3$, $H_2O$); and 4) biological methods (e.g., white rod fungi).

Recently, a Biomass Refining Consortium for Applied Fundamentals and Innovation (CAFI) undertook the first coordinated project to develop comparative information on the performance of leading pretreatment options. The consortium concluded that the best pretreatments included: dilute acid, flow-through pretreatment, ammonia fiber explosion, ammonia recycle percolation (ARP), and lime pretreatment. Additionally, two other possible pretreatments have been intensively investigated in Europe and Canada: steam explosion with or without $SO_2$ impregnation, and organosolv. Typical conditions for biomass pretreatment are presented in Table 1.

TABLE 1

Technologies and representative reaction conditions for lignocellulosic pretreatment

| Pretreatment technology | Chemicals used | Temperature, (° C.) | Pressure, atm absolute | Reaction times, min |
|---|---|---|---|---|
| Dilute sulfuric acid: co-current | 0.5-3.0% sulfuric acid | 130-200 | 3-15 | 2-30 |
| Flowthrough pretreatment | 0.0-0.1% sulfuric acid | 190-200 | 20-24 | 12-24 |
| pH-controlled water pretreatment | water or stillage | 160-190 | 6-14 | 10-30 |
| AFEX | 100% (1:1) anhydrous | 70-90 | 15-20 | <5 |

TABLE 1-continued

Technologies and representative reaction conditions for lignocellulosic pretreatment

| Pretreatment technology | Chemicals used | Temperature, (° C.) | Pressure, atm absolute | Reaction times, min |
|---|---|---|---|---|
| ARP | ammonia 10-15 wt. % ammonia | 150-170 | 9-17 | 10-20 |
| Lime | 0.05-0.15 g Ca(OH)$_2$/g biomass | 70-130 | 1-6 | 1-6 hour |

Although intensive lignocellulose pretreatment efforts have been made during the past several decades, current leading technologies, including dilute acid, $SO_2$, controlled pH, AFEX, ARP, flow-through, organosolv, and lime pretreatment, have not yet been commercialized on a large scale due to high processing costs and great investment risks. But nearly all intensively-studied pretreatments share one or several of the common shortcomings: 1) severe pretreatment conditions (except AFEX), resulting in degradation of sugars and formation of inhibitors; 2) low or modest cellulose digestibility because of the presence of residual lignin and hemicellulose; 3) high cellulase loading requirement; 4) slow hydrolysis rate because a significant fraction of pretreated lignocellulose remains crystalline; 5) large utility/energy consumption; 6) huge capital investment due to economy of scale; and 7) less co-utilization of other major components of lignocellulose except organosolv.

Dilute acid pretreatment (DA), typically using (dilute) sulfuric acid, is the most investigated pretreatment method. Conducted at relatively high temperatures (e.g., 150-200° C.) and pressures (e.g., 120-200 psia), DA pretreatment solubilizes acid-labile hemicellulose and thereby disrupts the lignocellulosic composite linked by covalent bonds, hydrogen bonds, and van der Waals forces. As a result, the condensed lignin remains on the surface of crystalline cellulose following DA, potentially hindering subsequent enzymatic hydrolysis.

Organosolv pulping offers environmentally benign benefits, smaller capital investment, co-product utilization, and lower feedstock transportation costs, as compared with Kraft pulping. Organosolv pretreatment has been developed from organosolv pulping, and was being studied for producing fermentable sugars after enzymatic hydrolysis as early as the 1980s. In general, organosolv pretreatments use a lignin-extracting solvent blend containing catalysts such as acids or alkalis, and water/organic solvents (e.g., ethanol and methanol) to extract lignin in high temperature and high pressure digesters.

Currently, the Lignol process is being developed as part of a commercial lignocellulose biorefinery in Canada. In that process, the lignin extracting step is carried out at about 180-200° C. and about 400 psi by a blend of ethanol/water in the range of about 50:50 (w/w) plus about 1% $H_2SO_4$ for 30-90 minutes. After organosolv pretreatment, a black liquor containing sulfur-free lignin, furfural, hemicellulose sugars, and other natural chemicals such as acetic acid, is further processed to: 1) precipitate and recover the lignin by diluting the black liquor with an aqueous steam, followed by filtering, washing, and drying; 2) recover and recycle the ethanol by flashing of the hot black liquor and condensation of the vapors, and distill the filtrate and washings from the lignin precipitation; 3) recover the acetic acid, furfural, and extractives from the distillation column, and separate xylose from the stillage; and 4) convert the hemicellulose oligosaccharides into sugars that can be fermented to produce more ethanol or other high value products. An economic analysis report by the Lignol Innovations Co. suggests that revenues from the multiple co-products, particularly the lignin, ethanol, and xylose fractions, ensure excellent economy for a small plant (about 100 metric tons per day), which is a twentieth of the input of a typical lignocellulose biorefinery.

Lignocellulose saccharification by concentrated acids is another common pretreatment method. Dissolving and hydrolyzing native cellulose in concentrated sulfuric acid, followed by a dilution with water, was reported in the literature as early as 1883. Industrial wood saccharification involves many technical and economic problems, e.g., acid-resistant equipment, acid recovery, and final sugar yields. These problems have not yet been solved in spite of the numerous commercial processes that have been developed in Germany, Switzerland, Japan, the USA, and the former USSR since the beginning of the last century. The commercially tested technologies are the Scholler-Tomesch process in 1926, applying dilute sulfuric acid (0.4% $H_2SO_4$); the Bergius-Rheinau process in 1937, applying the super-concentrated hydrochloric acid (41% HCl); and the concentrated sulfuric acid process developed in 1948, using a membrane to separate sugar and acid. In the United States, the Madison process was developed during World War II as a continuous, rather than discontinuous, system based on the principle of the Scholler-Tomeshch process. The processes using concentrated acids have the advantage of low reaction temperature, but costs for the corrosion-resistant equipment are very high. The main technical problems in applying concentrated sulfuric acid are soluble sugar/solid acid separation, acid recovery, and acid re-concentration.

Recently, a process called cellulose solvent- and organic solvent-based lignocellulose fractionation (COSLIF) was developed. A cellulose solvent (e.g., concentrated phosphoric acid or ionic liquid) enables the crystalline structure of cellulose to be disrupted. This type of pretreatment can also be carried out at low temperatures (e.g., at about 50° C.) and at atmospheric pressure, which minimizes sugar degradation. Subsequent washing steps are used to fractionate biomass; a first washing with an organic solvent to remove lignin; and a second washing with water to remove fragments of partially-hydrolyzed hemicellulose (and potentially cellulose). The COSLIF approach produces highly reactive amorphous cellulose, which can be enzymatically hydrolyzed quickly and at high glucan digestibility yield COSLIF can be regarded a hybrid technology for cellulose solvent-based biomass pretreatment, concentrated acid saccharification, and organosolv. As compared to other cellulose solvent-based biomass pretreatment technologies, this new technology involves lignin removal technology and efficient solvent recycling. As compared to organosolv, this technology can be conducted at lower temperatures, hemicellulose degradation is minimized (minimizing furfural as a major product), the resulting amorphous cellulosic materials is more reactive than that from organosolv, and a different combination of solvents is used. Unlike concentrated acid saccharification, concentrated phosphoric acid is used for limited hydrolysis, resulting in long-chain polysaccharides that are insoluble in the solvents. Therefore, the separation of sugar with concentrated phosphoric acid is a solid/liquid separation. But in the concentrated acid saccharification, sugar/acid separation is a liquid/liquid separation. COSLIF also differs from most biomass pretreatment technologies (e.g., diluted acid, AFEX, hot water, steam explosion, etc.) in that the COSLIF process can generate amorphous cellulose that can be hydrolyzed easily and quickly, and can be used to isolate lignocellulose components, such as lignin.

A leading technology for lignocellulose pretreatment is disclosed in international patent application number PCT/US2006/011411 (publication number WO 2007/111605), which is incorporated herein in its entirety by reference. In embodiments, that patent application teaches a method that includes: adding a first solvent to lignocellulosic material to dissolve cellulose and hemicellulose; adding a second solvent to precipitate amorphous cellulose and hemicellulose and to partially solubilize lignin; separating the cellulose and hemicellulose from the lignin; separating the hemicellulose from the cellulose; recovering the products; and recycling the first solvent and the second solvent. The method of that invention thus includes separating glucose-containing cellulose from mixed sugar-containing hemicellulose. It also includes multiple organic solvents for fractionating cellulose, lignocellulose, lignin, and acetic acid, as well as multiple mechanical or electromechanical devices for separating solids (e.g., cellulose) from liquids (e.g., organic solvents).

SUMMARY OF THE INVENTION

The present invention provides a solution to drawbacks of the currently available technologies. The invention provides a novel method for conversion of plant material, including material containing cellulose, hemicellulose, and lignocellulose, to usable energy sources, such as carbohydrates, ethanol, and hydrogen. In general, the invention provides a novel lignocellulose pretreatment to effectively overcome shortcomings of current commercially available technologies. The present invention better enables conversion of plant material to usable energy sources by, among other things, 1) expanding the use of concentrated acid to all cellulose solvents (a use that unexpectedly provides advantageous features), and 2) using a super cellulose solvent (e.g., polyphosphoric acid, or a mixture of concentrated phosphoric acid and $P_2O_5$, or $P_2O_5$ vapor, or a mixture of $H_3PO_4/P_2O_5$) to decrease solvent use volume. The present invention also improves conversion of plant material to usable carbohydrates, which can be converted to, among other things, energy sources by, among other things, 1) use of a one-step solvent to both precipitate cellulose and hemicellulose in their amorphous forms and to solubilize lignin, and 2) stripping of at least the amorphous cellulose and hemicellulose using low temperature steam under atmospheric or below atmospheric pressures.

The present invention represents an improvement over currently known technologies, and includes improvements to certain aspects of the prior leading technology, as disclosed in WO 2007/111605. Among the improvements, in embodiments, the present invention eliminates the separation of C5 and C6 sugars, notably by eliminating the step of separating cellulose from hemicellulose and its hydrolysis intermediates. Other improvements provided by embodiments of the invention include decreasing the number of organic solvents used to produce end products for use in energy production, decreasing water consumption through steam spraying to remove organic solvents. Furthermore, in embodiments, the present process provides an improved efficiency for removal of lignin. The present process thus could be applied to softwood eliminates a sugar concentration step that is routinely performed after hydrolysis of amorphous cellulose. The improvements provided by the present invention provide a surprising improvement in yield of sugars from lignocellulosic materials. That is, a process according to the present invention can yield exceptionally high levels of a C5 and C6 sugar solution (more than 100 grams of sugar per liter). This titer is unexpectedly higher than a typical titer of the previous disclosure WO 2007/111605, which yields sugar solutions having about 25 g/L.

Additional advantages realized by the present invention include, in embodiments, a decrease in the initial capital investment required by (i) simplifying a two organic solvent fractionation distillation column to a simple flash or several tray distillation system that recovers only one organic solvent, (ii) reducing the number of wash steps, and (iii) simplifying a cellulose solvent recycling process. Further advantages realized by embodiments of the present invention include a reduction in economic reliance on potential revenues for co-products (acetic acid and/or lignin) to make the process economically feasible, and a decrease in energy consumption required for lignocellulose particle reduction.

Accordingly, in one aspect, the invention provides a method of pretreatment of lignocellulose for degradation into compounds useful in energy production. In general, the method comprises: digesting lignocellulose with polyphosphate; precipitating cellulose and hemicellulose with a solvent or a mixture of solvents; washing the precipitated cellulose and hemicellulose with a solvent; and stripping the washed precipitate to remove solvent. The method can also include gross reduction in lignocellulose particle size prior to lignocellulose degradation with polyphosphate. In embodiments, the method is a method of degrading lignocellulose into one or more subunit components (e.g., cellulose, hemicellulose, and lignin) or into one or more small compounds (e.g., sugars) that can serve as energy sources. In other embodiments, the method is a method of producing cellulose, hemicellulose, lignin, or combinations of two or all three of these.

The method of pretreatment can include additional method steps to provide a method of producing one or more compounds that serve as energy sources. In particular, the method can be a method of producing one or more sugars, including but not limited to C5 and C6 sugars, such as glucose, xylose, mannose, and galactose. In general, the method of producing an energy source from lignocellulose comprises: digesting lignocellulose with polyphosphate; precipitating cellulose and hemicellulose with a solvent or a mixture of solvents; washing the precipitated cellulose and hemicellulose with a solvent; stripping the washed precipitate to remove solvent; and exposing the precipitate to one or more cellulose or hemicellulose degrading enzymes under conditions that permit enzymatic degradation of the cellulose, hemicellulose, or both. The method can, in embodiments, include separation or purification of degradation products, such as one or more sugars, from reactants.

In another aspect, the present invention provides a system for pretreatment of lignocellulose. In general, the system comprises at least one container, vessel, etc. for digesting lignocellulose, for mixing and precipitating cellulose and hemicellulose and for extracting lignin, for washing precipitated cellulose and/or hemicellulose, and for stripping solvent from precipitated cellulose and/or hemicellulose. Preferably, the system comprises a separate container, vessel, etc. for each of the different actions described. In embodiments, the system can further comprise a device for reducing the size of lignocellulosic material to a size that is advantageous for degradation of the lignocellulosic material into cellulose and/or hemicellulose. In embodiments, the system is a system for degrading lignocellulose. In other embodiments, the system is a system for producing cellulose, hemicellulose, lignin, or a combination of two or all three of these from lignocellulose.

In embodiments, the system further comprises at least one container, vessel, etc. for separation of lignin. For example, the system can comprise a distillation column that is capable of separating lignin from organic solvents and polyphosphate. In some embodiments, the system comprises a furnace for separation of polyphosphate from other substances. In these embodiments, the polyphosphate can be reused in subsequent lignocellulose degradations using the system.

In yet further embodiments of the system, a container, vessel, etc. is included for hydrolysis of cellulose and/or hemicellulose into small compounds (e.g., sugars) that can serve as energy sources. For example, the system can comprise a hydrolysis tank in which cellulose and/or hemicellulose can be enzymatically degraded to sugars.

BRIEF DESCRIPTION OF THE DRAWINGS

The accompanying drawings, which are incorporated in and constitute a part of this specification, illustrate exemplary embodiments of the system of the invention, and together with the written description, serve to explain certain principles of the invention.

DETAILED DESCRIPTION OF VARIOUS ASPECTS OF THE INVENTION

Reference will now be made in detail to various exemplary embodiments of the invention, examples of which are illustrated in the accompanying drawings. It is to be understood that the following detailed description is not a limitation on the invention, but is instead provided to give the reader a better understanding of certain details of aspects and features of the invention.

Currently known technologies for conversion of plant material to useful energy sources have some limitations. Among those limitations are: 1) amorphous cellulose found in the aqueous phase of known compositions for production of energy sources has a low sugar concentration (~20-25 g sugar/L). Thus, it is desirable to re-concentrate the dilute sugar solution to a high sugar solution (>100 g sugar/L) before fermentation; 2) the markets for some co-products are yet not available or, if they are, such as in the case of lignin, large amounts of high quality co-products (e.g., lignin) are not produced; therefore, it could be hard to consume lignin and sell lignin at decent prices before a robust lignin market is developed; 3) the currently available technology requires a high capital investment for the distillation column for separating acetic acid and acetone, which are used in the currently known systems; and 4) the possible high processing costs for organic solvent separation and recycling. The present method and system address these limitations and provide a more robust means for commercial conversion of plant material to useful energy sources.

With regard to the first limitation mentioned above, the presently disclosed process includes removal of the organic solvent from a mixture of amorphous cellulose and hemicellulose that comes after organic solvent washing by stripping, preferably through the use of steam to evaporate the organic solvent. For example, in the present method and system, the second washer of prior systems can be replaced by one or more vacuum dryers or strippers. Use of such dryers or strippers produces a product that is hydrated amorphous cellulose and hemicellulose, which can be decomposed, such as by hydrolysis by enzymes (e.g., cellulase to degrade hemicellulose), acids, microorganisms, or combinations of these. Typically, the cellulose/hemicellulose composition resulting from stripping with steam contains about 20-30% solid content, which is well suited for direct hydrolysis by enzymes, acids, and/or microorganisms to produce highly concentrated sugar solutions. Thus, according to the present invention, after hydrolysis, high concentration sugar solutions can be obtained. In preferred embodiments, some amount of residual organic solvent from amorphous carbohydrates (e.g., ethanol, butanol, acetone) are recycled at the hydrolysis step or even after the fermentation step. Different from the previously known designs, the present system and method can produce a mixed stream containing both pentoses and hexoses rather than two separate streams of pentoses and hexoses.

With regard to the second limitation mentioned above regarding currently available processes, the present process and system includes, in embodiments, burning the mixture of $H_3PO_4$/lignin/extractive to regenerate $P_2O_5$ or super phosphoric acid. In such embodiments, lignin is used as a fuel, similar to the process in the paper industry.

With regard to the third limitation discussed above, in embodiments, the present system and process replace an expensive fractionation and distillation column with a simple distillation column or a flash system. This replacement can cut the initial total investment, perhaps up to 30% or more.

With regard to the fourth limitation mentioned above, the new designs disclosed herein can decrease the processing cost greatly, with less volume of organic solvent recycling and a simpler recovery process.

In one aspect, the present invention provides a method of pretreatment of lignocellulose for degradation into compounds useful in energy production. In general, the method comprises: digesting lignocellulose with polyphosphate; precipitating cellulose and hemicellulose with a first solvent or a mixture of solvents; washing the precipitated cellulose and hemicellulose with a second solvent; and stripping the washed precipitate to remove solvent.

According to the method, digesting lignocellulose comprises combining polyphosphate (i.e., super cellulose solvent; super phosphoric acid) with lignocellulose. The lignocellulose can be provided in a purified, semi-purified, or unpurified state. For example, it can be provided as a simple or complex composition comprising lignocellulose as a substantial solid portion of the composition. The composition can comprise other biological material and one or more solvents, such as water. The step of digesting further comprises allowing the lignocellulose and polyphosphate to remain in contact under conditions where the polyphosphate decomposes or dissolves the lignocellulose into its subunit components cellulose, hemicellulose, and lignin. Preferably digesting is performed such that at least 50%, more preferably at least 90%, and most preferably substantially all of the cellulose and hemicellulose present are dissolved.

According to the present method, the dissolved cellulose and hemicellulose are then precipitated with a first solvent or a mixture of first solvents. Precipitation occurs as a result of combining the digested lignocellulose composition with one or more solvents under conditions to allow for precipitation of at least some of the cellulose and/or hemicellulose. Preferably at least 50%, more preferably at least 90%, and most preferably substantially all of the amorphous cellulose and dissolved hemicellulose are precipitated during this step.

The step of precipitating cellulose and/or hemicellulose further includes dissolving and/or extracting lignin present in the composition. Preferably at least 20%, and more preferably at least 50%, and most preferably substantially all of the lignin is separated from the cellulose and hemicellulose at this step.

According to the method, the first solvent can be any solvent or combination of solvents that is suitable for precipitating cellulose, hemicellulose, or both, and for dissolving lignin. Preferably, the first solvent comprises one or more of the following: methanol, ethanol, 1-propanol, 2-propanol, acetone, propanal, 1-butanol, 2-butanol, butanal, butanone (methyl ethyl ketone), t-butanol, and water. In preferred embodiments, the solvent comprises ethanol, a butanol, acetone, water, or a combination of two or more of these. Additional solvents include, but are not limited to $CO_2$ or mixtures of $CO_2$ and one or more solvents listed above, or solvents with similar characteristics for separation of oligomeric to polymeric carbohydrates from lignin, acetic acid and (poly-)phosphoric acid.

The method of the invention further comprises washing the precipitated cellulose and hemicellulose with a second solvent or combination of solvents. The second solvent can be any solvent or combination of solvents that is suitable for washing the cellulose and/or hemicellulose. Preferably, the solvent is one that is suitable for removal of phosphoric acid from the cellulose and/or hemicellulose. In preferred embodiments, the second solvent is one, or a mixture of two or more of, the solvents listed above as preferred first solvents. In some preferred embodiments, the solvent comprises ethanol, butanol, acetone, water, or a combination of two or more of these.

The step of washing results in separation of amorphous cellulose and hemicellulose from substantially all of the lignin and phosphoric acid present in the digestion and precipitation compositions. The lignin, phosphoric acid, and other non-cellulose or hemicellulose components can be further processed in certain embodiments, as described in more detail below.

The washed amorphous cellulose and hemicellulose is then stripped of remaining solvent through any suitable means. For example, the washed precipitate can be exposed to vacuum, heat, gas stripping, steam, or a combination of these to evaporate the solvent from the precipitate. Preferably, steam, more preferably low temperature steam alone or in combination with vacuum, is used to evaporate the solvent from the precipitate. As compared to currently used processes, which rely on one or more wash steps using water, the present method provides a fast, effective, and inexpensive way to remove the first/second solvent from the precipitate. A reduction in water usage not only reduces costs for performing the method, but it also provides a higher quality product. More specifically, use of water washes requires multiple washes and results in a product that has extremely high water content, which typically must be removed before the product can be provided in a useful form. However, according to the present method, small amounts of water in the form of steam can be used to evaporate solvents and provide a useful product. Because small amounts of steam are required, less water is used in the process, and cost savings are achieved. Furthermore, the stripped product that is produced has a significantly higher solid content than achieved by prior methods, which allows for immediate use in further processing reactions. Thus, time to prepare the product is reduced as is the need for equipment and handling of the cellulose and hemicellulose.

The resulting combination of hydrated amorphous cellulose and amorphous hemicellulose is suitable for any purpose. In embodiments, discussed in detail below, the hydrated product is used as a source for hydrolytic and/or fermentation reactions to produce concentrated sugar compositions and/or organic solvents. Advantageously, the use of steam to strip solvent from the cellulose and hemicellulose results in a product that has a detectable, and even substantial, water content, which is preferred for subsequent treatment of the cellulose and hemicellulose. Where steam is used as a stripping agent in the stripping process, the dried amorphous cellulose and hemicellulose is obviously not in a dry state because of the presence of water. However, for convenience of discussion, this product is referred to herein as "dried". Indeed, in preferred embodiments, the dried cellulose and hemicellulose can contain a significant amount of water, for example, at least 50% (w/w), at least 60% (w/w), at least 70% (w/w), at least 75% (w/w), or at least 80% (w/w) water, with the cellulose and/or hemicellulose making up most, if not all, of the remaining portion.

In addition to the steps recited above, the method of pretreatment of lignocellulose can comprise steps relating to pre-processing of starting materials and post-processing of non-cellulose and non-hemicellulose substances. For example, prior to digesting, the lignocellulose material can be treated in any number of ways to provide gross reduction in lignocellulose particle size. Further, in embodiments, prior to digestion the lignocellulose material, which can be for example hardwood, softwood, recycled paper, waste paper, forest trimmings, pulp and paper waste, corn stover, corn fiber, wheat straw, rice straw, sugarcane bagasse, or switchgrass, can be washed, can have its moisture content altered, or can be conditioned in any other desired way. In preferred embodiments, the lignocellulose material is adjusted to have a moisture content of about 5-30%, more preferably about 10-20%, and most preferably about 15%. Prior to entering the digester, lignocellulose biomass with a high soluble sugar and/or protein content can be pre-extracted by a solvent (e.g., hot water) to remove those extractives (sugars or proteins).

Another optional step in the pretreatment process is a separation step between washing of the amorphous cellulose and hemicellulose and stripping of the washed product. The separation step can be accomplished by any suitable means, including, but not limited to known liquid/solid separation techniques, such as filtration and centrifugation.

Yet another optional step for the method is the capture and reuse of the solvent(s) released, typically by evaporation/volatilization, during stripping. Advantageously, the solvent(s) can be captured at this step and reused as solvent(s) for precipitating and washing the cellulose and/or hemicellulose.

In some embodiments, lignin, phosphoric acid, solvent(s), and other substances removed during the washing step are further processed to provide co-products. For example, the wash solution can be subjected to a distillation column to separate components based on their physical properties (e.g., volatility). Likewise, the wash solution can be subjected to any of a number of liquid/solid separation techniques, such as filtration and centrifugation, to separate substances based on size, weight, density, etc. In preferred embodiments, lignin is removed from other components and captured as a highly purified co-product. In highly preferred embodiments, the wash solution is first subjected to a distillation process to remove and capture one or more solvents (e.g., ethanol), and the non-solvent fraction subjected to one or more liquid/solid separation techniques to separate lignin from the remaining substances.

The wash solution, or the components of the wash solution remaining after distillation and/or liquid/solid separation, can, in embodiments, be heated at high temperatures to produce co-products. For example, the wash solution after subjected to distillation and liquid/solid separation, can be heated in a furnace or other similar unit operations (e.g., wet oxidation) to produce co-products such as ash and polyphosphoric acid. As with the solvent optionally recovered from the stripping step and from the optional distillation process, the polyphosphoric acid can be reused in the method, thus improving the cost effectiveness of the method in general.

It is to be noted here that prior methods in this technological field use high-tray-number expensive fractionation distillation columns to separate volatile components (e.g., solvents, non-solvent short chain carbon molecules, etc.). While use of such columns are encompassed by the present invention, it has been found that use of a simple distillation column provides adequate separation and co-product production and accumulation.

In addition to the method steps mentioned above, with or without the optional steps, the invention provides further steps, which result in a method of producing one or more compounds that serve as energy sources. For example, the method can be a method of producing sugars, solvents, such as alcohols, or both. In general, the method of producing compounds that serve as energy sources comprises: digesting lignocellulose with polyphosphate; precipitating cellulose and hemicellulose with a first solvent or a mixture of solvents; washing the precipitated cellulose and hemicellulose with a second solvent; stripping the washed precipitate to remove solvent; and hydrolyzing or otherwise decomposing the cellulose and/or hemicellulose into subunit components. In preferred embodiments, the method of pretreatment described above is used to produce relatively dried amorphous cellulose and amorphous hemicellulose for use in the method of producing energy source compounds. That relatively dried cellulose and hemicellulose is exposed to conditions that decompose the cellulose and hemicellulose into simpler compounds. The conditions can be any conditions suitable to achieve the goal. For example, the cellulose and hemicellulose can be exposed to soluble or solid acid, to one or more enzymes, to one or more microorganisms, or to a combination of decomposing agents. In exemplary embodiments, the cellulose/hemicellulose is exposed to one or more cellulose or hemicellulose degrading enzymes (e.g., cellulase) under conditions that permit enzymatic degradation of the cellulose, hemicellulose, or both.

The method can, in embodiments, include separation or purification of degradation products, such as one or more sugars, from reactants. For example, known liquid/solid separation techniques can be used to separate sugars (e.g., glucose, galactose, mannose) from cellulose and hemicellulose, as well as from enzymes and/or other substances present in the degradation reaction composition. Advantageously, when steam stripped amorphous cellulose and hemicellulose are used as reactants, the reactants are present in an amount of about 20%-30% of the solid content. Due at least in part to this high solid content, very high concentrations of sugars, on the order of 100 grams of sugars per liter, can be achieved.

It is to be noted that, while production of sugars is one preferred embodiment, production of other products are also encompassed by the invention. For example, hydrolysis reaction conditions can be set up such that the cellulose and hemicellulose are converted predominantly or completely to ethanol as a desired end product. Thus, in exemplary embodiments, one or more microorganisms, which are capable of degrading cellulose and/or hemicellulose and are capable of fermenting sugars to alcohols (e.g., ethanol) can be combined with the cellulose and hemicellulose under conditions that permit degradation of the cellulose and hemicellulose and fermentation of resulting sugars to alcohol. The alcohol produced by the microorganism(s) can then be captured for use as an energy source (e.g., to power internal combustion engines). Alternatively, the alcohol can be used for any other suitable purpose, including use in the present methods as a solvent for precipitation and washing.

As will be evident to those of skill in the art, the method can comprise one or more additional steps, which can be included to improve the cost effectiveness of the method. For example, substances from the hydrolysis reaction that are not desired for their energy production capability can be removed, for example by solid/liquid separation techniques. These substances can then be purified or further treated to produce useful substances. In preferred embodiments, solid calcium phosphate from the hydrolysis reaction can be reacted with sulfuric acid to produce calcium sulfate, which is a waste, and phosphoric acid, which can be used as cellulose solvent.

In addition to the aspects of the invention relating to methods, the present invention provides systems for pretreatment of lignocellulose, for production of cellulose and/or hemicellulose, and for production of one or more substances that can serve as an energy source. In general, the systems of the invention provide hardware, solvents, and/or reactants for carrying out the methods of the invention. Thus, in embodiments, the systems comprise vessels for digesting lignocellulose, precipitating and/or washing cellulose and hemicellulose, and stripping amorphous cellulose and hemicellulose of solvents. In further embodiments, the systems comprise one or more distillation or fractionation/distillation columns, one or more solid/liquid separators, and one or more furnaces. In yet further embodiments, the systems include one or more hydrolysis vessel. Yet again, the system can include one or more vessels for altering the size, water content, etc. of the raw material that is to provide the lignocellulose material to be acted upon. Systems according to the present invention can, but do not necessarily, include solvents and reactants for production and separation of products and co-products.

In any of the embodiments discussed herein, the vessels can generally be a continuously stirred tank, a continuous tubular reactor, or a batch tank. Any vessel can work provided there is a means for moving solid, liquid, and gas materials into and out of the system. The vessel contents are preferably mixed to some extent, in order to reduce mass-transfer limitations between the solvent and the solid phase, and to enhance the rate of approach towards phase equilibrium. Materials of construction are chosen based on the selected solvent and process conditions, and the desired flexibility for the particular vessel. In general, special vessels are not necessary due to the modest process conditions for practicing this invention.

Other general parameters and considerations for systems and methods for pretreatment of lignocellulose and production of sugars and other energy sources are discussed in WO 2007/111605, which is incorporated herein in its entirety by reference.

Figure 1:
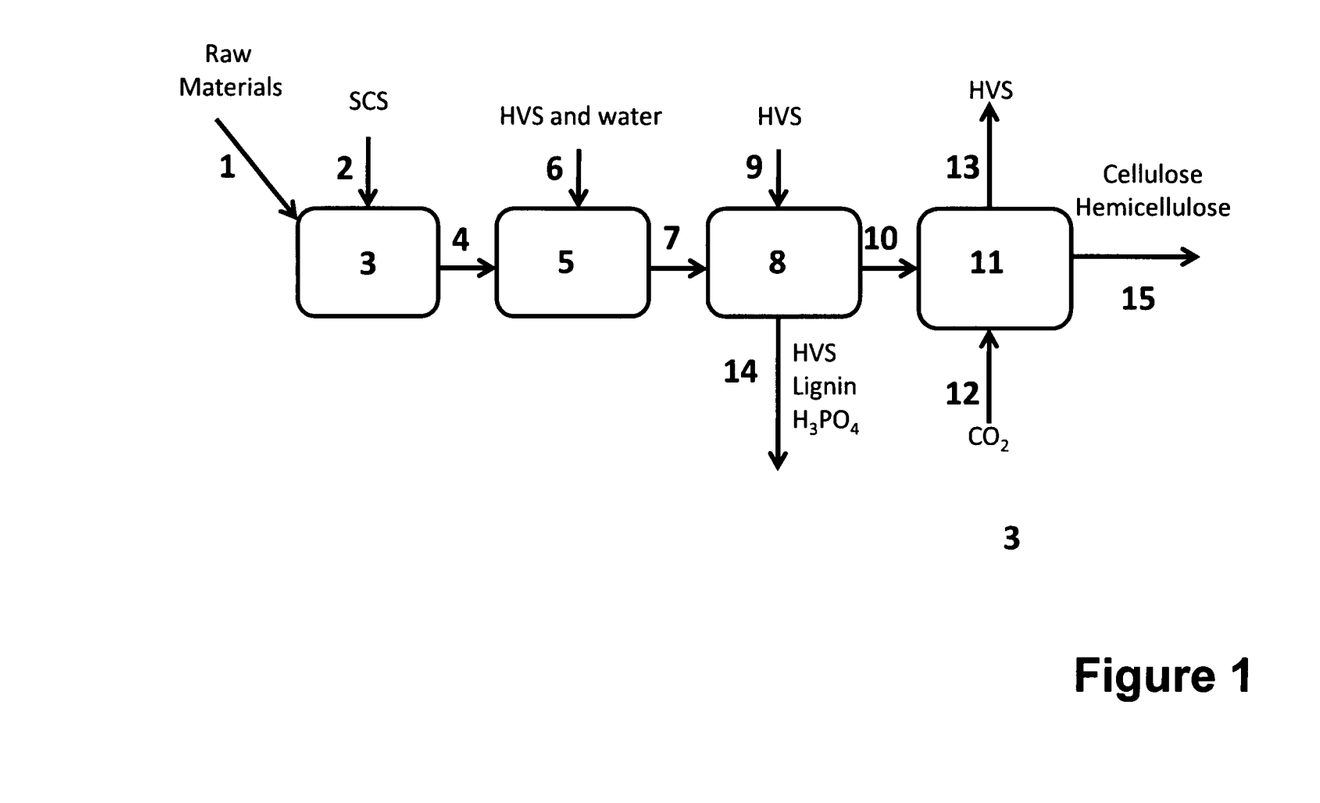
FIG. 1 is a schematic diagram of an embodiment of a system for degradation of lignocellulose to lignin and a mixture of cellulose and hemicellulose, or both.

Turning now to the figures, FIG. 1 depicts a diagram showing an embodiment of a system and process for conversion of plant matter to usable energy sources. The present discussion relates to practice of a method according to the invention using that embodiment of the system.

Raw materials, containing 1.2 kg of 15% moisture lignocellulose-containing biomass having an average particle size of less than 0.5 cm, are placed 1 in a digester 3 and 3 liters of a super cellulose solvent (SCS) are added 2. It is to be noted that the SCS is preferably polyphosphate or phosphoric acid. In addition, although wet lignocellulose of 0.5 cm or small particle size is discussed here, the raw materials can be wet lignocellulose of any size, including but not limited to the scale of 2.5 cm or smaller. The SCS in this example is polyphosphate (poly-$P_2O_5$) used at an 85% concentration, which is added in the form of steam or fine droplets of super concentrated phosphoric acid (for example, $P_2O_5$>70%). About 6 kg of polyphosphate is added. The combination is mixed well in digester 3. The reaction time ranges from several minutes to hours. The mixing of water and acid is an exothermic process; a relatively high temperature (e.g., 50° C. to even 120° C.) has been found to be appropriate for cellulose dissolution. At the same time, the conditions favor partial cellulose and hemicellulose hydrolysis. The ratio of lignocellulose (dry weight) to $P_2O_5$ is approximately 1:6, although the ratio can be any suitable ratio, such as a ratio from 1:1 to 1:10, such as 1:1 to 1:5. When tested, the dissolved lignocellulose looked like a gel.

After the lignocellulose is digested in digester 3, the mixture is transferred 4 to precipitation tank 5, water is first added 6 to precipitate dissolvent cellulose and hemicellulose. A highly volatile solvent (HVS), ethanol, is added 6 at a concentration of 80% in an amount of 10 liters to precipitate more cellulose and hemicellulose, as well as to solubilize lignin. Alternatives to ethanol at this step include other solvents, such as acetone and methanol. In addition, $CO_2$ can be used to dissolve more lignin under high pressure. Another option is to add a mixture of water and the highly volatile solvent.

After precipitation, the mixture is transferred 7 to washer 8. In washer 8, additional HVS (in this case, ethanol) is used 9 to wash precipitated cellulose and hemicellulose and remove liquid solvent efficiently. Depending on the washing efficiency, anywhere from 10-20 liters of approximately 80% ethanol is used to wash the mixture. The washer, which is a solid/liquid separator, is a counter-current washing device or centrifuge. However, in other embodiments, it can be any of a number of regular filtration devices, such as pressure belt filters, and screen drivers, to name a few. After solid/liquid separation, the liquid phase is removed 14. The liquid phase includes some solvent, phosphoric acid, and lignin. In typical runs, the liquid composition comprised 99% $H_3PO_4$ and further contained approximately 50% of the initial lignin from the biomass. It further contained ethanol and water.

The solid phase after washing contains amorphous cellulose and hemicellulose plus ethanol. In typical runs, the solid phase contains 0.40 kg of cellulose and 0.2 kg of hemicellulose and a total weight of 2.3 kg. This composition is transferred 10 to stripper 11. In the present example, carbon dioxide is used 12 to gas strip and dry the cellulose and hemicellulose, and to remove the ethanol 13. In alternative embodiments, vacuum or heat or steam could be used instead of carbon dioxide. In tests run using steam, the amount of ethanol removed was 1.29 kg, representing a 95% removal efficiency. The residue obtained is nearly dry amorphous cellulose and hemicellulose, which is removed 15 from stripper 11.

Figure 2:
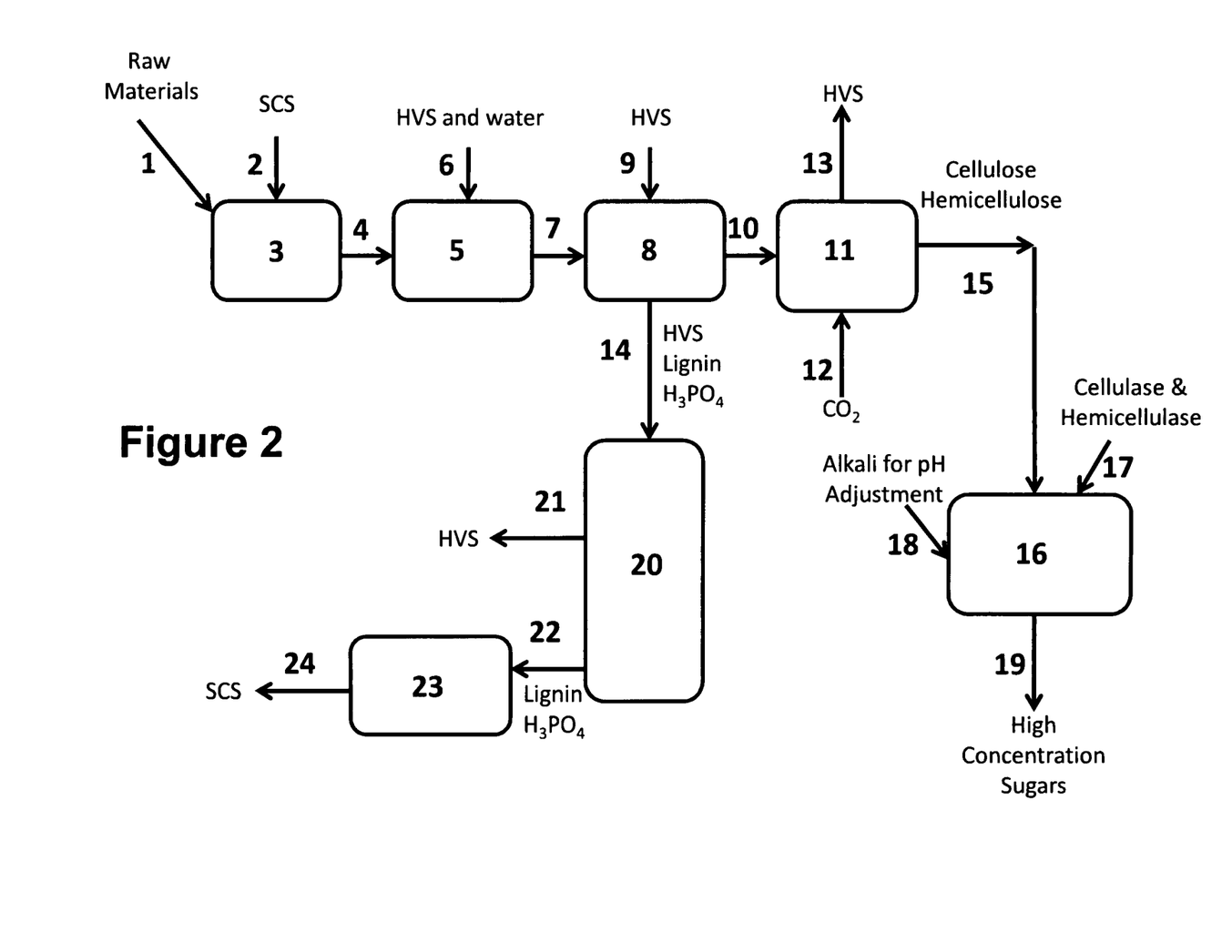
FIG. 2 is a schematic diagram of an embodiment of a system for degradation of lignocellulose to a mixture C6 and C5 sugars, ethanol, and lignin.

FIG. 2 depicts a diagram showing an embodiment of a system and process for conversion of plant matter to usable energy sources. The present discussion relates to practice of a method according to the invention using that embodiment of the system. It is to be noted that this embodiment includes the system and method discussed above with regard to FIG. 1, but also includes additional system components and method steps.

In the system and process according to FIG. 2, relatively dry amorphous cellulose and hemicellulose having a 75% moisture content is transferred 15 to hydrolysis tank 16. The enzymes cellulase and hemicellulase are added 17, and the pH of the composition adjusted to a suitable value by addition of alkali 18 (calcium carbonate). Upon completion of degradation of the cellulose and hemicellulose by the enzymes, highly concentrated sugars are obtained 19. It was found that the concentration of sugars depended on the solid phase/enzyme solution ratio. The hydrolysis time could range from several hours to several days, depending on enzyme loading and enzyme properties. During the hydrolysis step, it is possible to remove a small amount of residual highly-volatile solvent.

Also as part of the system and method depicted in FIG. 2, a flasher 20 is included. In the flasher, highly-volatile solvent (ethanol in this example) is separated 21 from other washer liquid fraction components. A small amount of acetic acid typically remains in the liquid phase, particularly where it is preferred not to use a high vacuum or high temperature for its separation in order to save processing cost and decrease capital investment. The residual liquid phase contains phosphoric acid, solvent-dissolved lignin, extractive of lignocellulose, acetic acid, and a small amount of carbohydrate. In order to save cost of capital investment and processing costs, the liquid phase is transferred 22 to a furnace 23 and burned directly in furnace 23 using the energy stored in the lignin. In typical runs, prior to burning, the waste contains approximately 0.08 kg of lignin. The ash ($P_2O_5$ mainly, depicted in the figure as SCS) is captured 24 and can be used for the next round of pretreatment.

Figure 3:
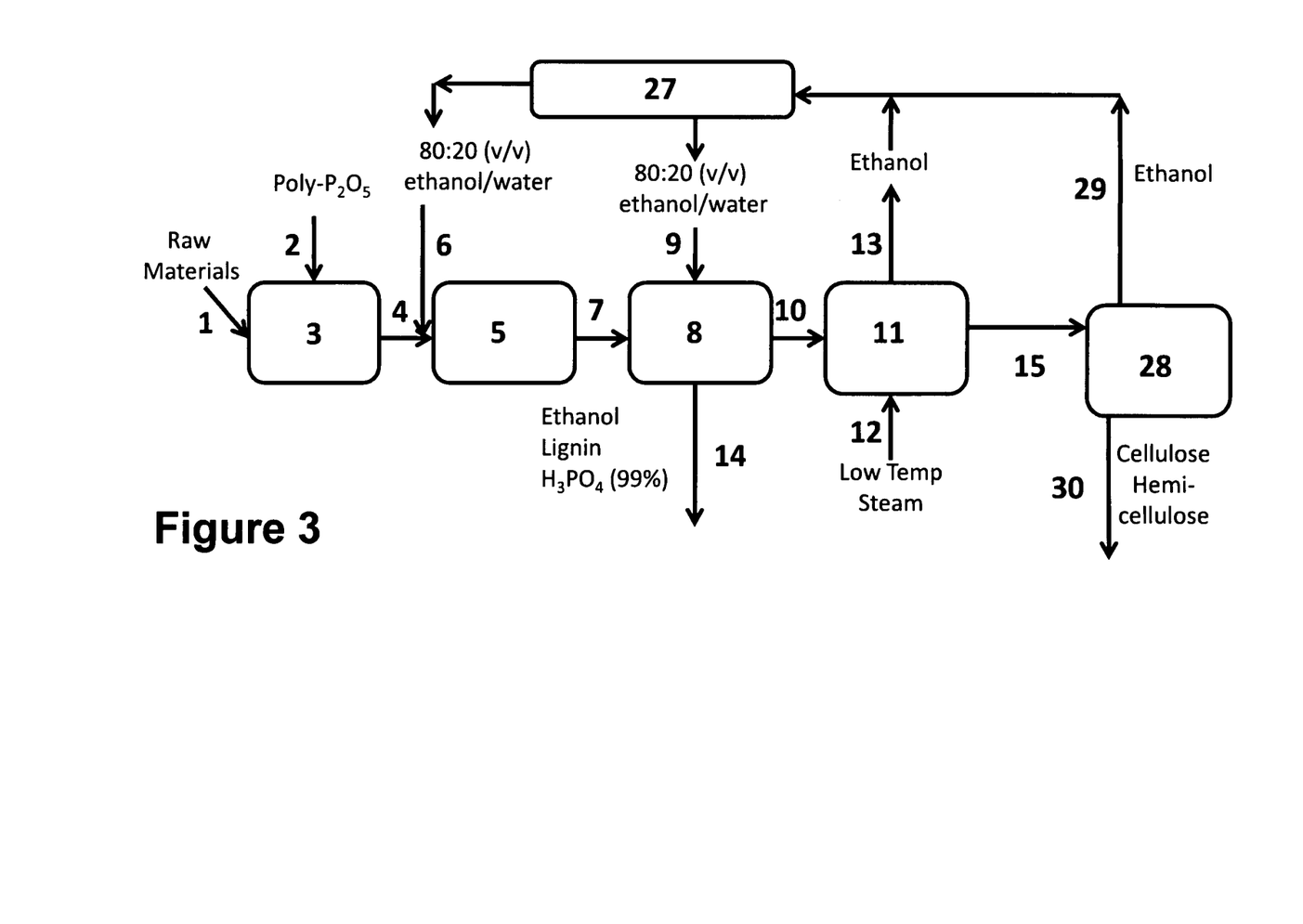
FIG. 3 is a schematic diagram of an embodiment of a system for degradation of lignocellulose to lignin and a mixture of cellulose and hemicellulose, or both.

Turning now to FIG. 3, another embodiment of the system and method of the invention for producing cellulose and hemicellulose from lignocellulose is depicted schematically. As shown in FIG. 3, raw lignocellulose containing materials are introduced 1 into digester 3. The raw materials have an approximate size of 0.5 cm or smaller in their longest direction and a moisture content of about 15%. Polyphosphate is added 2 to digester 3 and the lignocellulose materials are mixed well and allowed to be digested, producing a slurry containing mainly cellulose, hemicellulose, and lignin as bio-based products. The digested material is transferred 4 to precipitation tank 5. During transfer, a mixture of 80:20 (vol/vol) ethanol:water is added 6 to the mixture. In precipitation tank 5, cellulose and hemicellulose are precipitated, and lignin is dissolved. The mixture is then transferred 7 to washer 8, to which additional 80:20 ethanol:water is added 9. The solid and liquid fractions are separated: the liquid fraction is collected 14. The solid fraction is transferred 10 to stripper 11. At stripper 11 low temperature steam is exposed 12 to the solid material to evaporate the ethanol solvent. Evaporated ethanol (with steam/water) is removed 13 from stripper 11 and collected in solvent holding tank 27.

The stripped solid material is transferred 15 to screw dryer 28 where additional ethanol is captured and removed 29 to solvent holding tank 27. The dried cellulose and hemicellulose cake from screw dryer 28 is collected 30.

Figure 4:
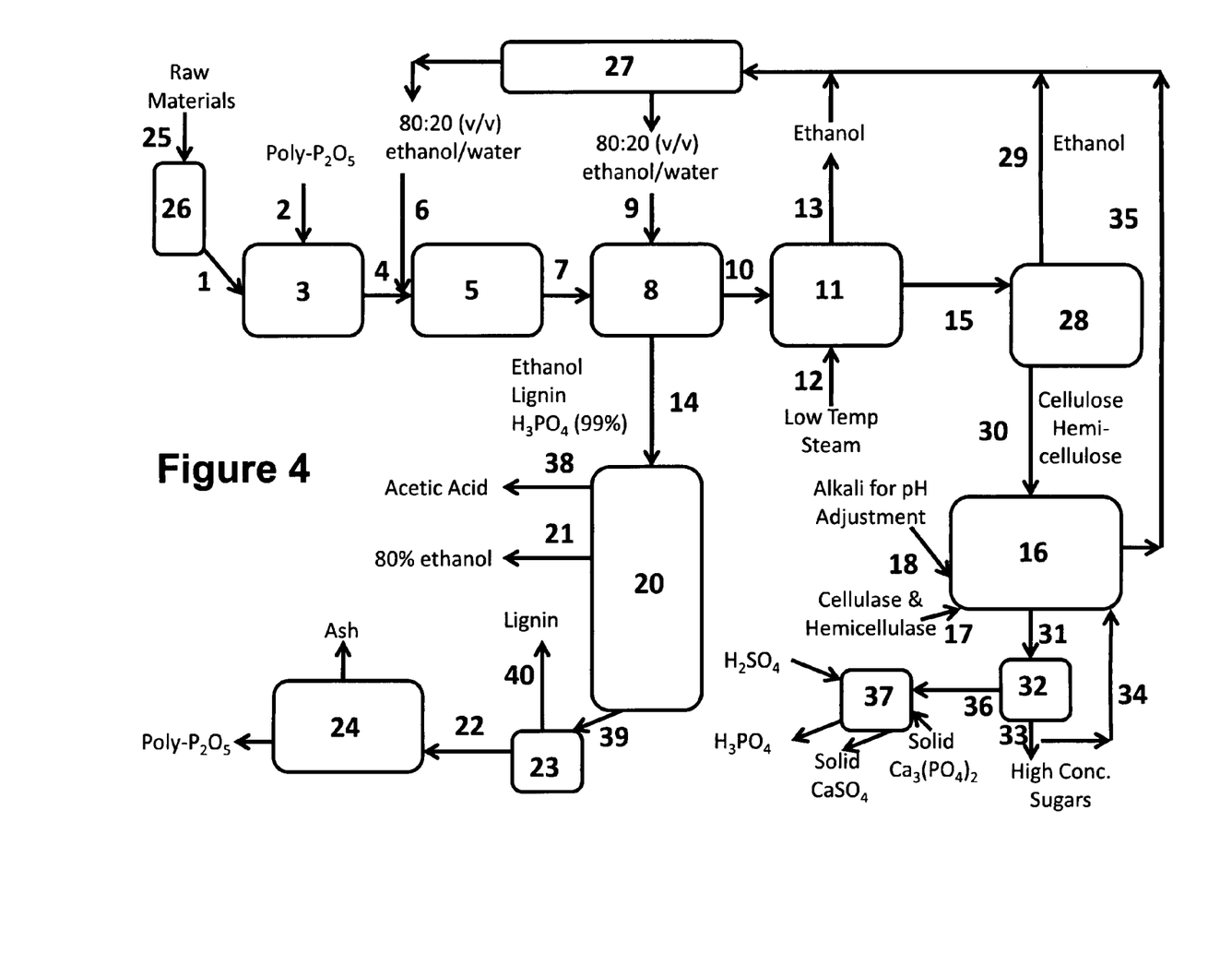
FIG. 4 is a schematic diagram of an embodiment of a system for degradation of lignocellulose to a high concentration C6 and C5 sugar mixture, ethanol, and lignin.

FIG. 4 depicts a diagram showing yet another embodiment of a system and process for conversion of plant matter to usable energy sources. The present discussion relates to practice of a method according to the invention using that embodiment of the system. It is to be noted that this embodiment includes the system and method discussed above with regard to FIG. 3, but also includes additional system components and method steps.

As shown in FIG. 4, raw lignocellulose containing materials are introduced 25 into cutter 26, where the raw materials are reduced in size to approximately 0.5 cm or smaller in their longest direction. At this step, the raw materials can be additionally treated, for example by washing to remove some lignocellulose extractives (e.g., proteins and some soluble sugars), to provide enriched lignocellulosic materials for further processing. After acted upon at cutter 26, the lignocellulose materials, which typically has about a 15% moisture content, are transferred 1 to digester 3. Polyphosphate is added 2 to digester 3 and the lignocellulose materials are mixed well and allowed to be digested, producing mainly cellulose, hemicellulose, and lignin as bio-based products. The digested material is transferred 4 to precipitation tank 5. During transfer, a mixture of 80:20 (vol/vol) ethanol:water is added 6 to the mixture from solvent holding tank 27. In precipitation tank 5, cellulose and hemicellulose are precipitated, and lignin is dissolved. The mixture is then transferred 7 to washer 8, to which additional 80:20 ethanol:water is added 9 from solvent holding tank 27. The solid and liquid fractions are separated: the liquid fraction is transferred 14 to fractionation/distillation column 20, while the solid fraction is transferred 10 to stripper 11. At stripper 11 low temperature steam is exposed 12 to the solid material to evaporate the ethanol solvent. Evaporated ethanol (with steam/water) is removed 13 from stripper 11 and collected in solvent holding tank 27.

The stripped solid material is transferred 15 to screw dryer 28 where additional ethanol is captured and removed 29 to solvent holding tank 27. The dried cellulose and hemicellulose cake from screw dryer 28 is transferred 30 to hydrolysis tank 16. Cellulase and hemicellulase are added 17 to enzymatically digest the cellulose and hemicellulose, and the pH is adjusted with alkali 18 to allow for optimal enzymatic activity. After hydrolysis, the mixture is transferred 31 to solid/liquid separator 32. The solid/liquid separator in this example is a centrifuge, but any suitable separator could be used. In the liquid phase, sugars at high concentrations (greater than 30 g/l) are obtained 33. In certain batches, a portion of the high concentration sugar solution is reintroduced 34 into hydrolysis tank. The soluble sugars can be mixed with the dried amorphous cellulose and hemicellulose for hydrolysis again for a higher sugar concentration solution, or can be used for fermentation directly.

In certain configurations of the system and method, the system is used primarily for production of sugars for use as a fuel source. In other configurations, the system and method are configured to produce one or more alcohols. The hydrolysis tank and its components can be modified to achieve the desired production goal. For example, where sugars are desired, the hydrolysis tank can include acids or enzymes that are capable of degrading cellulose and hemicellulose into their component sugar building blocks. Where an alcohol (e.g., ethanol) is desired, the hydrolysis tank can contain microorganisms that can degrade cellulose and hemicellulose to the alcohol. In such embodiments, the alcohol can be captured. In the embodiment depicted in FIG. 4, the production of both sugars and ethanol is depicted. In the figure, ethanol produced from the hydrolysis tank is captured and removed 35 to solvent holding tank 27. Of course, the produced alcohol can be removed to another vessel and used for other purposes.

Solid/liquid separator 32 also produces a solid phase, which is transferred 36 to reactor 37. At reactor 37 sulfuric acid and solid calcium phosphate are added to the solid phase and allowed to react. After reaction, solid calcium sulfate and phosphoric acid are produced.

Turning back now to the liquid phase produced as a result of washing at washer 8, the liquid phase contains mainly ethanol, phosphoric acid, and lignin. The liquid phase is transferred 14 to fractionation/distillation column 20. The fractionation/distillation column 20 separates acetic acid 38 and ethanol 21 from other components. Typically, the ethanol recovered was an 85% solution. The remaining components of the wash liquid phase are transferred 39 to solid/liquid separator 23, where lignin is separated 40. The remaining components of the wash solution are transferred 22 to furnace 24 and burned to produce ash and polyphosphate, which can be used in subsequent batches of degradation.

Figure 5:
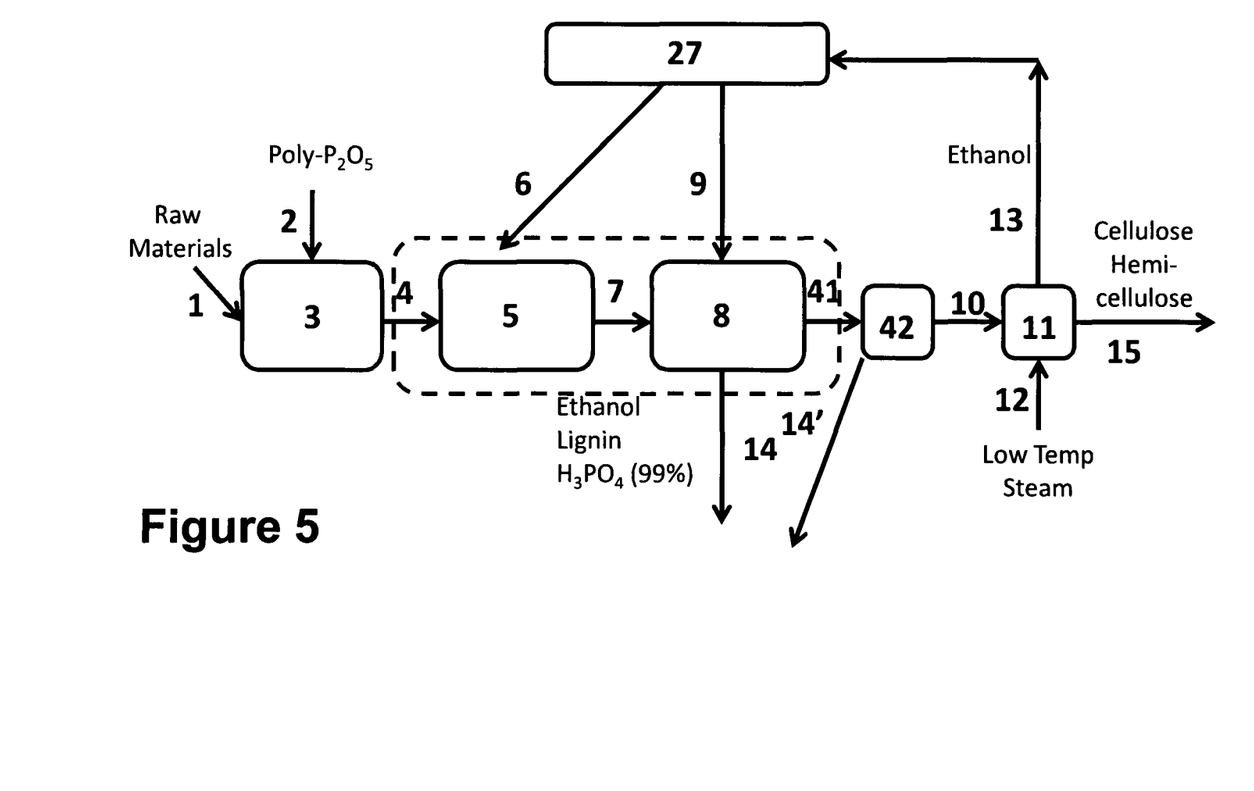
FIG. 5 is a schematic diagram of an embodiment of a system for degradation of lignocellulose to lignin and a mixture of cellulose and hemicellulose, or both.

FIG. 5 depicts another exemplary embodiment of the system and method of the present invention for degrading lignocellulosic materials to cellulose and hemicellulose. As shown in the figure, raw materials are added 1 to digester 3. Polyphosphate is also added 2 to digester 3, and the materials are mixed well and the lignocellulose is allowed to degrade to cellulose, hemicellulose, and lignin. More specifically, in digester 3, the lignocellulose material is mixed well with $P_2O_5$ vapor or fine droplets of super concentrated phosphoric acid with a final $P_2O_5$ concentration of 83%. Although a concentration of 83% is used in this example, it is to be noted that any suitable concentration can be used, such as 70% or greater, 75% or greater, or 80% or greater. The heat released from mixing of water and polyphosphoric acid or phosphoric acid, or mixtures thereof, is used to accelerate biomass dissolution. The temperature can vary from 40° C. to up to 120° C., and is preferably 45° C. to 100° C., more preferably 47° C. to 90° C., and most preferably 50° C. to 85° C. The reaction time can vary from several minutes to up to several hours, but is preferably 30 to 240 min, more preferably 45 to 180 min, and most preferably 60 to 120 min. Typically, the dissolved biomass looked like a slurry.

The digested material is then transferred 4 to precipitation tank 5, to which a solution of about 80% ethanol is added 6 from solvent holding tank 27. The mixture is maintained for a sufficient amount of time to precipitate cellulose and hemicellulose and to solubilize lignin. The mixture is then transferred 7 to washer 8, and the mixture is washed with 80% ethanol 9 from solvent holding tank 27. The washed precipitate is then transferred 41 to solid/liquid separator 42, which in this case is a drum centrifuge, to remove from the slurry most of the free solvent and other substances in the wash solution. The liquid fraction is removed 14' and can be combined with the wash liquid fraction removed at 14. In other embodiments, other mechanical equipment (e.g., screw dryer) can be used at this point. The solid content resulting from the process and apparatus varied from 5-20%. It is preferable to achieve a solid content of 8% or more, more preferably 10% or more, and most preferably 15% or more. In the figure, precipitation tank 5 and washer 8 are enclosed within a single box, indicated by a dashed line. This is to indicate that, in some embodiments, a consolidated, single unit reactor can implement both functions. In such embodiments, precipitation tank 5 and washer 8 are a single unit.

The slurry is transferred 10 to stripper 11 and ethanol extracted using low temperature steam 12. Volatilized ethanol is released 13 as ethanol (plus steam) vapor, and collected in solvent holding tank 27. In stripper 11, the slurry containing amorphous cellulose, hemicellulose, residual undissolved lignin, plus a small amount of phosphoric acid in the organic solvent (e.g., ethanol) is stripped by low-temperature steam under decreased or atmospheric pressure. The slurry typically has a solid content of 5-20%. It is preferred that the slurry have a solid content from 5-20%, preferably 8% or greater, more preferably 10% or greater, and most preferably 15% or greater. In typical runs, the slurry had a total sugar content from 40% to 90% based on solid weight. Preferably, the sugar content is 60% or greater, more preferably 65% or greater, and most preferably 80% or greater. In this unit operation, low-temperature steam (about 60° C.-120° C.) is used. Regardless of the apparatus used, the wet biomass slurry is dried like solid particles in a fluidized bed or spray dryer. The heat (e.g., from steam) is used to vaporize most of the organic solvent (e.g., 80-99% of the ethanol, preferably at least 85%, more preferably at least 95%, and most preferably at least 98% of the ethanol). After this operation, the dried biomass typically has a solid content from 10-40%. It is preferred that, at this stage, the biomass has a solid content of 20% or more, more preferably 25% or more, and most preferably 30% or more, with water plus some remaining organic solvent (e.g., 5% of initial organic solvent). The dried cellulose/hemicellulose is removed 15 from stripper 11 for later use.

Figure 6:
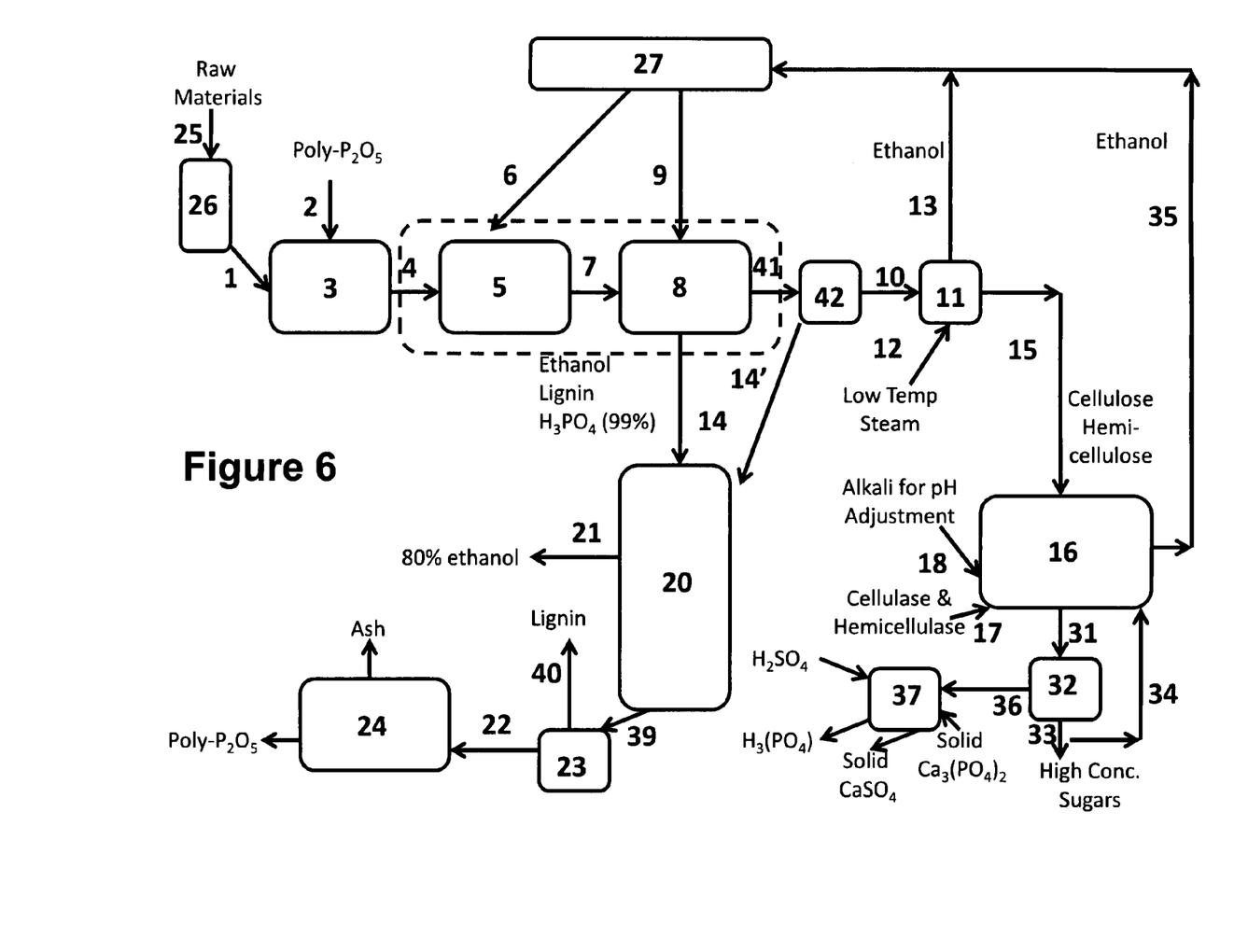
FIG. 6 is a schematic diagram of an embodiment of a system for degradation of lignocellulose to a mixture of C6 and C5 sugars and lignin.

FIG. 6 depicts a diagram showing yet another embodiment of a system and process for conversion of plant matter to usable energy sources. The present discussion relates to practice of a method according to the invention using that embodiment of the system. It is to be noted that this embodiment includes the system and method discussed above with regard to FIG. 5, but also includes additional system components and method steps. As shown in FIG. 6, raw lignocellulose containing materials are introduced 25 into cutter 26, where the raw materials are reduced in size to approximately 0.5 cm or smaller in their longest direction. At this step, the raw materials can be additionally treated, for example by washing, to provide enriched lignocellulosic materials for further processing. As in other embodiments in which a cutter is used, the cutter (miller) decreases biomass particle size less than 2.54 cm. The moisture content of the biomass can vary from about 5-50%. In this embodiment, prior to the next step, the biomass moisture is set at a fixed value (10-30%). In preferred embodiments, the moisture content is set at 15%. Over-dry biomass particle can be mixed with water for the desired moisture content. After acted upon at cutter 26, the lignocellulose materials, which preferably have about a 15% moisture content, are transferred 1 to digester 3. Polyphosphate is added 2 to digester 3 and the lignocellulose materials are mixed well and allowed to be digested, producing mainly cellulose, hemicellulose, and lignin as bio-based products. The digested material is transferred 4 to precipitation tank 5. During transfer, a mixture of 80:20 (vol/vol) ethanol:water is added 6 to the mixture from solvent holding tank 27. In precipitation tank 5, cellulose and hemicellulose are precipitated, and lignin is dissolved. The mixture is then transferred 7 to washer 8, to which additional 80:20 ethanol:water is added 9 from solvent holding tank 27. The liquid wash solution is captured and transferred 14 to distillation column 20. The solid phase slurry from the washing step is transferred 41 to solid/liquid separator 42, which in this case is a drum centrifuge, to remove from the slurry most of the free solvent and other substances in the wash solution. The liquid fraction is removed 14' and either combined with the wash liquid fraction removed at 14 or applied directly to distillation column 20. At stripper 11 low temperature steam is exposed 12 to the solid material to evaporate the ethanol solvent. Evaporated ethanol (with steam/water) is removed 13 from stripper 11 and collected in solvent holding tank 27.

The stripped solid material is transferred 15 to hydrolysis tank 16. Cellulase and hemicellulase are added 17 to enzymatically digest the cellulose and hemicellulose, and the pH is adjusted with alkali 18 to allow for optimal enzymatic activity. As in other embodiments, in the hydrolysis tank, some amount of alkali (e.g., lime or calcium carbonate) is used to adjust the pH to improve enzyme activity, such as by setting it at the enzyme's optimal pH. Cellulase and/or hemicellulase, or double functional enzymes can be used to hydrolyze amorphous cellulose plus hemicellulose to soluble sugars, respectively. The hydrolysis process can be run as a fed-batch mode, i.e., more wet amorphous cellulosic materials with a solid content of more than 20% can be added slowly stepwise (for better mixing) rather than added once at the beginning. A solution of high concentration of sugars can be obtained after hydrolysis with several batches of wet amorphous cellulose addition, being more than 100 g of soluble hexoses and pentoses per liter. Also, high concentration sugar solutions can be mixed with amorphous cellulose for simultaneous saccharification and co-fermentation (SSCF) or consolidated bioprocessing (CBP). The solid stream containing the remaining lignin, cellulose, and $Ca_3(PO_4)_2$ can be burned to remove any organics. The ashes containing $Ca_3(PO_4)_2$ can be regenerated to concentrated phosphoric acid by adding concentrated sulfuric acid. Some small amount of the organic solvent (e.g., ethanol) can be recycled during the hydrolysis step by vacuum or stripping or be recycled after sugar-to-ethanol fermentation.

After hydrolysis, the mixture is transferred 31 to solid/liquid separator 32. The solid/liquid separator in this example is a centrifuge, but any suitable separator could be used. In the liquid phase, sugars at very high concentrations (greater than 100 g/l) are obtained 33. In certain batches, a portion of the high concentration sugar solution is reintroduced 34 into hydrolysis tank. In such embodiments, the use of the sugar solution replaces water in solid cellulose for a higher sugar solution.

In certain configurations of the system and method, the system is used primarily for production of sugars for use as a fuel source. In other configurations, the system and method are configured to produce one or more alcohols. The hydrolysis tank and its components can be modified to achieve the desired production goal. For example, where sugars are desired, the hydrolysis tank can include acids or enzymes that are capable of degrading cellulose and hemicellulose into their component sugar building blocks. Where an alcohol (e.g., ethanol) is desired, the hydrolysis tank can contain microorganisms that can degrade cellulose and hemicellulose to the alcohol or other products. In such embodiments, the alcohol can be captured. In the embodiment depicted in FIG. 6, the production of both sugars and ethanol is depicted. In the figure, ethanol produced from the hydrolysis tank is captured and removed 35 to solvent holding tank 27. Of course, the produced alcohol can be removed to another vessel and used for other purposes.

Solid/liquid separator 32 also produces a solid phase, which is transferred 36 to reactor 37. At reactor 37 sulfuric acid and solid calcium phosphate are added to the solid phase and allowed to react. After reaction, solid calcium sulfate and phosphoric acid are produced.

Turning back now to the liquid phase produced as a result of washing at washer 8, the liquid phase contains mainly ethanol, phosphoric acid, and lignin. The liquid phase is transferred 14 to distillation column 20. The distillation column 20 separates ethanol 21 from other components. The ethanol recovered is typically about 80% in concentration. It is noted that, in this embodiment, an expensive fractionation/distillation column is not required, which improves the cost effectiveness of the process without reducing significantly the yield in product and co-products. A distillation column can be used in all embodiments, and thus can be substituted for the fractionation/distillation column in any of the preceding exemplary embodiments. In the distillation column, organic solvent (e.g., ethanol) is recycled by a several-tray distillation column. The concentration of the condensed ethanol from the column can vary from 50-95%, preferably 50%, more preferably 70%, and most preferably 80%. After or during removing of the organic solvent, the lignin precipitates at the bottom of the distillation column, which can be separated from the aqueous phosphoric acid. The remaining liquid phase contains mostly phosphoric acid, some lignin, and organic extractives of biomass.

The remaining components of the wash liquid phase are transferred 39 to solid/liquid separator 23, where lignin is separated 40. The phosphoric acid in the solid lignin is washed out with water or the organic solvent.

The remaining components of the wash solution are transferred 22 to furnace 24 and burned to produce ash and polyphosphate, which can be used in subsequent batches of degradation. In the furnace, the remaining liquid phase containing mostly phosphoric acid, some lignin, and organic extractives of biomass can be regenerated to $P_2O_5$ vapor, polyphosphoric acid, or a mixture of them. The term "furnace" includes wet oxidation. In order to decrease the processing costs and furnace size, only a fraction of the phosphoric acid will be completely oxidized to $P_2O_5$. The fraction of phosphoric acid passed through furnace 24 can vary from 1-100%, and it is preferably 15% or more, more preferably 20% or more, and most preferably 25% or more. When phosphoric acid contains high organic extractives, it can be converted to high purity $P_2O_5$. $P_2O_5$ can be sublimed; the ashes without $P_2O_5$ can be separated as a plant fertilizer. The sublimed $P_2O_5$ can be mixed with water to form poly-phosphoric acid, concentrated phosphoric acid, or be used to pre-treat wet biomass, for example directly in Digester 3.

Among many uses, the present process and system are suitable for hardwood and herbaceous materials. If it is applied to softwood, the process and system can be modified at several points: 1) during the digestion step, some catalysts can be added, for example, $SO_2$; 2) during the washing step, more lignin could be washed out by using high temperature solvents that can dissolve more lignin; 3) before the hydrolysis step, more lignin could be removed by adding some oxidizing reagents, such as $H_2O_2$, $O_3$, high concentration $O_2$, NO, etc. In summary, the above described process is much simpler than the currently known technologies, including, but not limited to, previous patent disclosures PCT/US2006/011411, PCT/US06/030894, U.S. Pat. No. 4,058,011, WO 9606207, SU 134 839 6A1 (Grinshpan D D, Tsygankova N G, Kaputskii F N), DE 3 035 084 (U.S. Pat. Nos. 4,839,113), and 6,139,959. Although the total revenues required will often be much lower than for earlier technologies (but higher than other pretreatments), the new design decreases capital investment and processing costs greatly as well as produces high concentrations of cellulose and hemicellulose, as well as sugar hydrolysate, which are suitable for ethanol fermentations, among other things.

It will be apparent to those skilled in the art that various modifications and variations can be made in the practice of the present invention and in construction of the present system without departing from the scope or spirit of the invention. Other embodiments of the invention will be apparent to those skilled in the art from consideration of the specification and practice of the invention. It is intended that the specification and examples be considered as exemplary only.

The invention claimed is:

1. A method for fractionating lignocellulosic biomass, the process comprising:
   digesting lignocellulose with polyphosphoric acid, wherein no hemicellulose has been removed from the lignocellulose prior to the digesting;
   co-precipitating cellulose and hemicellulose and solubilizing lignin with a first solvent;
   separating the solubilized lignin from the precipitated cellulose and hemicellulose; and
   stripping the first solvent from the precipitated cellulose and hemicellulose by exposing the cellulose, hemicellulose, and solvent to steam, vacuum, or a combination of these,
   wherein the process provides a mixture of hydrated amorphous cellulose and hydrated amorphous hemicellulose.

2. The method of claim 1, wherein the method does not comprise separating cellulose from hemicellulose.

3. The method of claim 1, wherein the first solvent comprises ethanol at approximately 80% concentration.

4. The method of claim 3, wherein the first solvent further comprises $CO_2$, $SO_2$, or $O_3$, or mixtures of two or all three of these.

5. The method of claim 1, wherein the method does not comprise use of a solvent in addition to the first solvent.

6. The method of claim 1, which is a method of producing sugars from lignocellulose, wherein the method further comprises: hydrolyzing the hydrated amorphous cellulose and hydrated amorphous hemicellulose to produce a composition comprising one or more sugars.

7. The method of claim 6, wherein the composition comprises sugars at a concentration of at least 30 grams per liter.

8. The method of claim 6, wherein the composition comprises sugars at a concentration of at least 50 grams per liter.

9. The method of claim 6, wherein the composition comprises sugars at a concentration of at least 100 grams per liter.

10. The method of claim 6, which results in a mixture of pentoses and hexoses.

11. The method of claim 1, wherein the lignocellulosic biomass contains 35-50 wt % cellulose, 15-35 wt % hemicellulose, and 5-30 wt % lignin.

12. The method of claim 1, wherein the digesting is performed at a temperature of from 40° C. to 90° C.

13. The method of claim 1, wherein the digesting is performed at a temperature of from 40° C. to 85° C.

14. The method of claim 1, wherein the digesting with polyphosphoric acid is performed without prior treatment with a dilute acid or alkali.

15. The method of claim 1, wherein the digesting lignocellulose with polyphosphoric acid is performed using raw lignocellulose.

16. The method of claim 15, wherein prior to digesting the raw lignocellulose is treated with a physical treatment chosen from one or more of dry milling, wet milling, irradiation, microwave, and swelling reagents.

17. The method of claim 15, wherein prior to digesting the lignocellulose with polyphosphoric acid, the lignocellulose is not subjected to a chemical treatment.

* * * * *